(No Model.)
D. A. NEIDIG.
HANDSAW.
No. 279,975. Patented June 26, 1883.
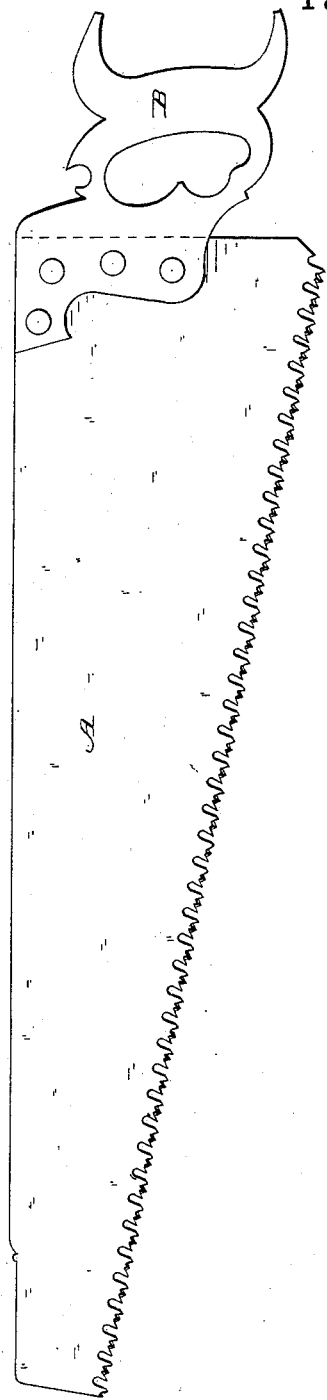
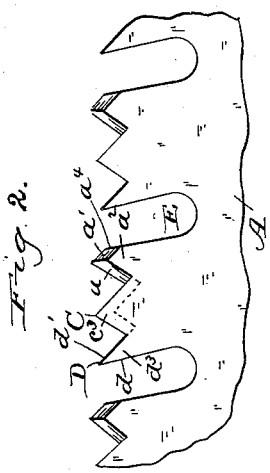
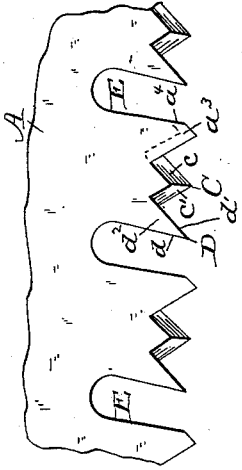
Witnesses
H. N. Low
J. S. Barker
Inventor
David A. Neidig
by Doubleday & Bliss
attys.

UNITED STATES PATENT OFFICE.

DAVID A. NEIDIG, OF CANTON, OHIO.

HANDSAW.

SPECIFICATION forming part of Letters Patent No. 279,975, dated June 26, 1883.

Application filed April 10, 1883. (No model.)

*To all whom it may concern:*

Be it known that I, DAVID A. NEIDIG, a citizen of the United States, residing at Canton, in the county of Stark and State of Ohio, have invented certain new and useful Improvements in Handsaws, of which the following is a specification, reference being had therein to the accompanying drawings.

The object of this invention is to provide for carpenters a saw which shall be equally available for ripping wood and for cross-cutting—that is to say, cutting with or parallel to the grain and cutting across the same.

Figure 1 is a face view of a handsaw embodying my improvements. Fig. 2 is a view of a portion of the teeth on a larger scale. Fig. 3 is a view from the opposite side.

In the drawings, A represents the main portion of the plate of the saw, and B the handle. The cutting-edge of the saw is provided with sets of teeth, there being three teeth in each set. The rear tooth of the set is constructed with two cutting-edges formed by beveling off two faces, $a\ a'$. Therefore the tooth proper has five faces—the two beveled faces $a\ a'$, a face, $a^2$, coinciding with one face of the blade, a face, $a^3$, coinciding with the other, and a rear edge face, $a^4$. The face $a^3$ is in fact an extension of the face of the blade, and along the lines where it joins the faces $a\ a'$ it forms cutting-edges, one of which operates when the saw is thrust forward and the other when it is pulled back. The next tooth, C, of the set is formed substantially similarly to the one just described, it being situated oppositely thereto, however. The faces $c\ c'$ form cutting-edges with the face $c^3$, that coincides with the face of the blade. The third tooth of the set, D, is a clearer, it being the front tooth of said set. This tooth is formed with four faces—the front face, $d$, and the rear face, $d'$, forming an edge transverse to the line of cut, the two side faces, $d^2\ d^3$, coinciding, respectively, with the side faces of the blade, and being substantially equal in area to that of the tooth in vertical section. The front edge, $d$, is inclined backwardly relatively to the central longitudinal line of the saw-blade, and is extended to a point considerably below the teeth, there being formed a comparatively deep recess, E, formed by extending inward and backward the rear face of the tooth in front and the last said face, $d$, of the clearer-tooth. The clearer-tooth of each set operates to carry away the material which is cut off by the cutters in front of it when the saw is being pushed forward.

When the teeth are constructed and arranged in substantially the way which I have shown and described, the saw is adapted for producing a rapid, smooth cut, whether it is being made across the grain or with it.

I am aware of the fact that saws have been made with sets of teeth having three teeth in each set, two of which were cutters and one a base recessed clearer, such construction being shown, for instance, in patent to C. J. Wilson, No. 196,850, dated November 6, 1877; but I am not aware of the fact that a saw containing the features which I have shown has been provided for a carpenter by which he can produce a smooth, rapid cut, and which shall be effective to sever the fibers when moving backward as well as forward, there being in my construction two cutting-edges formed on each cutter-tooth, the teeth being in sets of three, two of which are opposing chisels, and the third a base recessed clearer adapted to remove the dust or cuttings in whichever direction the saw be moved.

What I claim is—

A handsaw provided with sets of teeth, three teeth in each set, one being a cutter with the two beveled faces forming cutting-edges with the face $a^3$, coinciding with the face of the saw-plate, another, C, being an opposing cutter having two cutting-edges produced by the beveled faces $c\ c'$, meeting at a point and forming cutting-edges with the face $c^3$, coinciding with the face of the saw-blade, and the third being a base recessed clearer, D, all arranged substantially as set forth.

In testimony whereof I affix my signature in presence of two witnesses.

DAVID A. NEIDIG.

Witnesses:
J. P. FAWCETT,
HENRY FISHER.